(12) United States Patent
Ganireddy et al.

(10) Patent No.: US 10,587,121 B2
(45) Date of Patent: Mar. 10, 2020

(54) ELECTRICAL POWER SYSTEMS AND SUBSYSTEMS

(71) Applicant: General Electric Company, Schenectady, NY (US)

(72) Inventors: Govardhan Ganireddy, Roanoke, VA (US); Saurabh Shukla, Clifton Park, NY (US); Rajni Burra, Clifton Park, NY (US); Steven Wade Sutherland, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 15/602,193

(22) Filed: May 23, 2017

(65) Prior Publication Data

US 2018/0342875 A1   Nov. 29, 2018

(51) Int. Cl.
*H02J 3/38* (2006.01)
*H02M 5/42* (2006.01)
(Continued)

(52) U.S. Cl.
CPC ............... *H02J 3/386* (2013.01); *H02M 5/42* (2013.01); *F03D 9/255* (2017.02); *H02H 7/1216* (2013.01)

(58) Field of Classification Search
CPC ... F03D 9/25; F03D 9/255; F03D 9/00; F03D 9/003; H02P 9/007; H02P 9/00; H02P 9/42; H02P 9/102; H02P 2101/15; H02P 29/024; H03D 7/00; H03D 7/02; H03D 7/04; H02H 7/067; H02H 7/1216; H02K 7/183; H02K 7/18; H02M 5/44; F01D 15/10
(Continued)

(56) References Cited

U.S. PATENT DOCUMENTS 3,593,106 A   7/1971   Lafuze
4,281,371 A   7/1981   Baker
(Continued)

FOREIGN PATENT DOCUMENTS

EP    1276219 A1    1/2003
JP    2009/027766 A    2/2009
(Continued)

OTHER PUBLICATIONS

International Search Report and Written Opinion issued in connection with corresponding PCT Application No. PCT/US2018/032178 dated Sep. 12, 2018.
(Continued)

*Primary Examiner* — Rexford N Barnie
*Assistant Examiner* — Jagdeep S Dhillon
(74) *Attorney, Agent, or Firm* — Dority & Manning, PA

(57) ABSTRACT

An electrical power system includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid, the converter power path including a partial power transformer. Each of the electrical power subsystems further includes a low voltage distribution panel electrically coupled to the converter power path, a first switch on the stator power path, and a second switch on the converter power path.

10 Claims, 9 Drawing Sheets

(51) Int. Cl.
*F03D 9/25* (2016.01)
*H02H 7/12* (2006.01)

(58) Field of Classification Search
USPC ...... 307/82, 80, 43, 66, 64, 22, 45, 18, 145; 700/287, 288, 297, 298; 290/44, 42
See application file for complete search history.

(56) References Cited

U.S. PATENT DOCUMENTS

| | | | |
|---|---|---|---|
| 5,047,910 | A | 9/1991 | Levran et al. |
| 7,119,452 | B2 | 10/2006 | Larsen |
| 7,166,928 | B2 | 1/2007 | Larsen |
| 7,187,566 | B2 | 3/2007 | Kawashima et al. |
| 7,212,421 | B2 | 5/2007 | Chandra et al. |
| 7,224,081 | B2 | 5/2007 | Larsen |
| 7,521,907 | B2 | 4/2009 | Cervera et al. |
| 7,923,862 | B2 | 4/2011 | Cardinal et al. |
| 8,013,580 | B2 | 9/2011 | Cervera et al. |
| 8,041,465 | B2 * | 10/2011 | Larsen ............... H02J 3/16 700/287 |
| 8,659,178 | B2 | 2/2014 | Gabeiras et al. |
| 8,669,669 | B1 * | 3/2014 | Wagoner ............ H02P 9/007 290/44 |
| 8,736,241 | B2 | 5/2014 | Cervera et al. |
| 9,537,437 | B2 | 1/2017 | Wagoner et al. |
| 9,587,626 | B2 | 3/2017 | Sadaba et al. |
| 2012/0306204 | A1 * | 12/2012 | Garcia ............... H02J 3/1857 290/44 |
| 2013/0286692 | A1 | 10/2013 | Patel et al. |
| 2013/0289911 | A1 | 10/2013 | Patel et al. |
| 2014/0253058 | A1 | 9/2014 | Cervera et al. |
| 2014/0320056 | A1 | 10/2014 | Royak et al. |
| 2015/0108761 | A1 * | 4/2015 | Bala ................... F01D 15/10 290/54 |
| 2015/0249414 | A1 * | 9/2015 | Barker ............... H02P 9/007 290/44 |
| 2015/0267683 | A1 * | 9/2015 | Ubben ............... F03D 7/00 290/44 |
| 2015/0349687 | A1 * | 12/2015 | Liang ................ H02J 3/38 322/61 |
| 2016/0036221 | A1 | 2/2016 | Pan et al. |
| 2016/0333856 | A1 * | 11/2016 | Zabalza ............. H02H 7/06 |
| 2016/0352105 | A1 | 12/2016 | Tiwari et al. |
| 2017/0133971 | A1 * | 5/2017 | Huang .............. H02H 7/09 |
| 2017/0234299 | A1 * | 8/2017 | Kjær ................. F03D 7/042 290/44 |
| 2018/0034264 | A1 * | 2/2018 | Wagoner .......... H02H 7/067 |
| 2018/0038348 | A1 * | 2/2018 | Wang ................ F03D 9/255 |
| 2018/0171976 | A1 * | 6/2018 | Tan .................. F03D 7/0272 |
| 2018/0187652 | A1 * | 7/2018 | Wagoner ........... H02M 5/4585 |
| 2018/0302011 | A1 * | 10/2018 | Ganireddy ........ H02J 3/386 |
| 2018/0323618 | A1 * | 11/2018 | Wagoner ........... H02J 3/386 |
| 2018/0323620 | A1 * | 11/2018 | Ganireddy ........ H02J 3/386 |
| 2018/0351358 | A1 * | 12/2018 | Wagoner ........... H02M 1/12 |

FOREIGN PATENT DOCUMENTS

| | | |
|---|---|---|
| JP | 2009/516488 A | 4/2009 |
| KR | 2016/0081067 A | 7/2016 |
| WO | WO2009/138808 A1 | 11/2009 |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 pages. https://www.researchgate.net/publication/267966410.

* cited by examiner

ELECTRICAL POWER SYSTEMS AND SUBSYSTEMS

FIELD OF THE INVENTION

The present disclosure relates generally to electrical power systems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

One issue with such systems, however, is that the three-winding transformers 34 associated with each turbine 10 are expensive. Particularly, the secondary winding 35 of the transformer 34 that is connected to the generator stator 32 can be costly. Thus, it would be advantageous to eliminate such three-winding transformers from wind turbine power systems. Additionally, simplification of the protective components of such systems would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an electrical power system connectable to a power grid is provided. The electrical power system includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid, the converter power path including a partial power transformer. Each of the electrical power subsystems further includes a low voltage distribution panel electrically coupled to the converter power path, a first switch on the stator power path, and a second switch on the converter power path. The electrical power system further includes a cluster transformer electrically coupled to the cluster of electrical power subsystems, and a cluster power path extending between each electrical power subsystem and the cluster transformer to electrically couple the cluster transformer to the cluster of electrical power subsystems. The electrical power system further includes a substation transformer for connecting the cluster transformer to the power grid, and a collection system power path extending between the cluster transformer and the substation transformer.

In accordance with another embodiment, an electrical power subsystem for connection to a power grid is provided. The electrical power subsystem includes a generator including a generator stator and a generator rotor, and a power converter electrically coupled to the generator. The power converter includes a rotor-side converter, a line-side converter, and a regulated DC link electrically coupling rotor-side converter and the line-side converter. The electrical power subsystem further includes a stator power path for providing power from the generator stator to the power grid, and a converter power path for providing power from the generator rotor through the power converter to the power grid. The electrical power subsystem further includes a partial power transformer provided on the converter power path, a low voltage distribution panel electrically coupled to the converter power path, a first switch on the stator power path, and a second switch on the converter power path between the partial power transformer and the cluster power path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
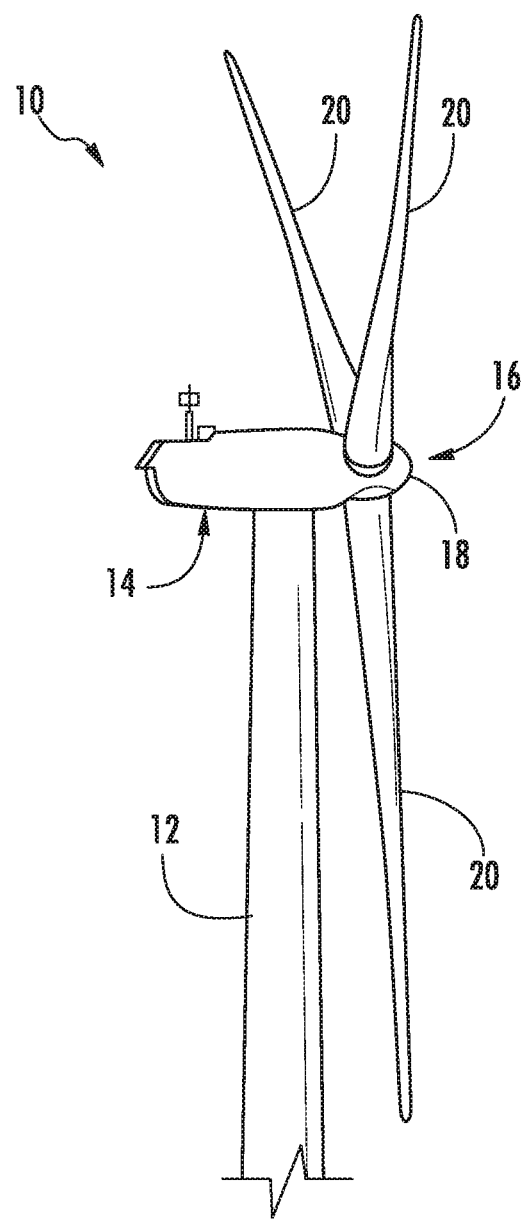
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
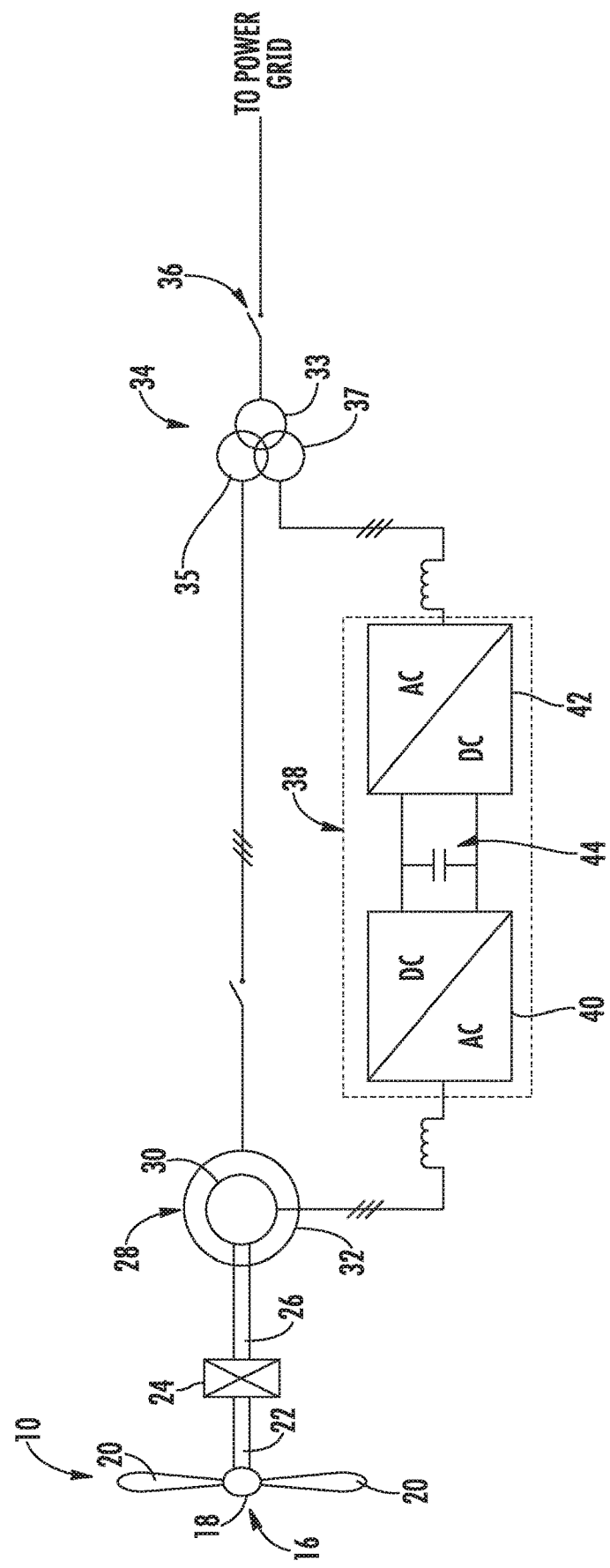
FIG. 2 illustrates a schematic diagram of a conventional electrical power system suitable for use with the wind turbine shown in FIG. 1.
Figure 3:
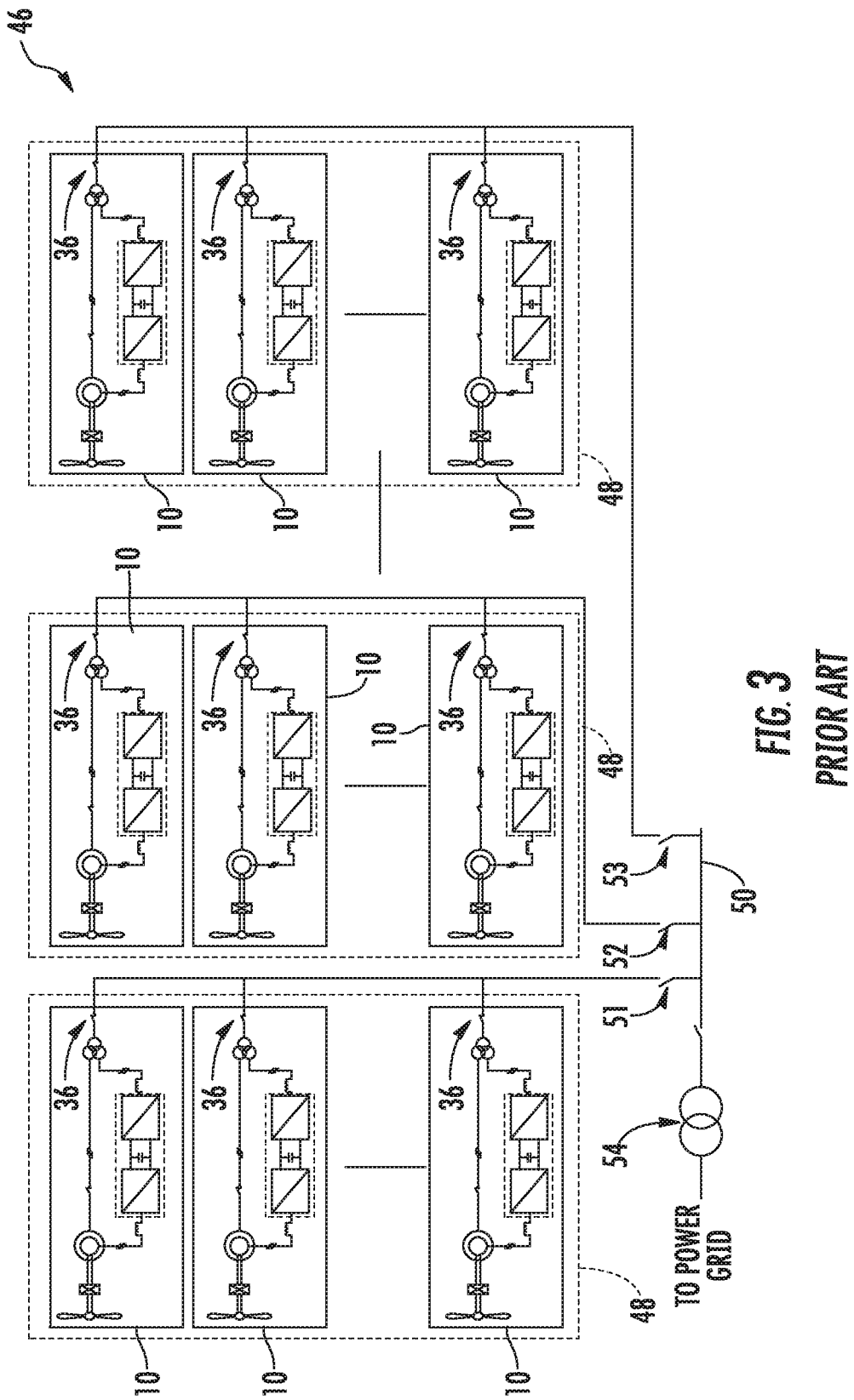
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.
Figure 4:
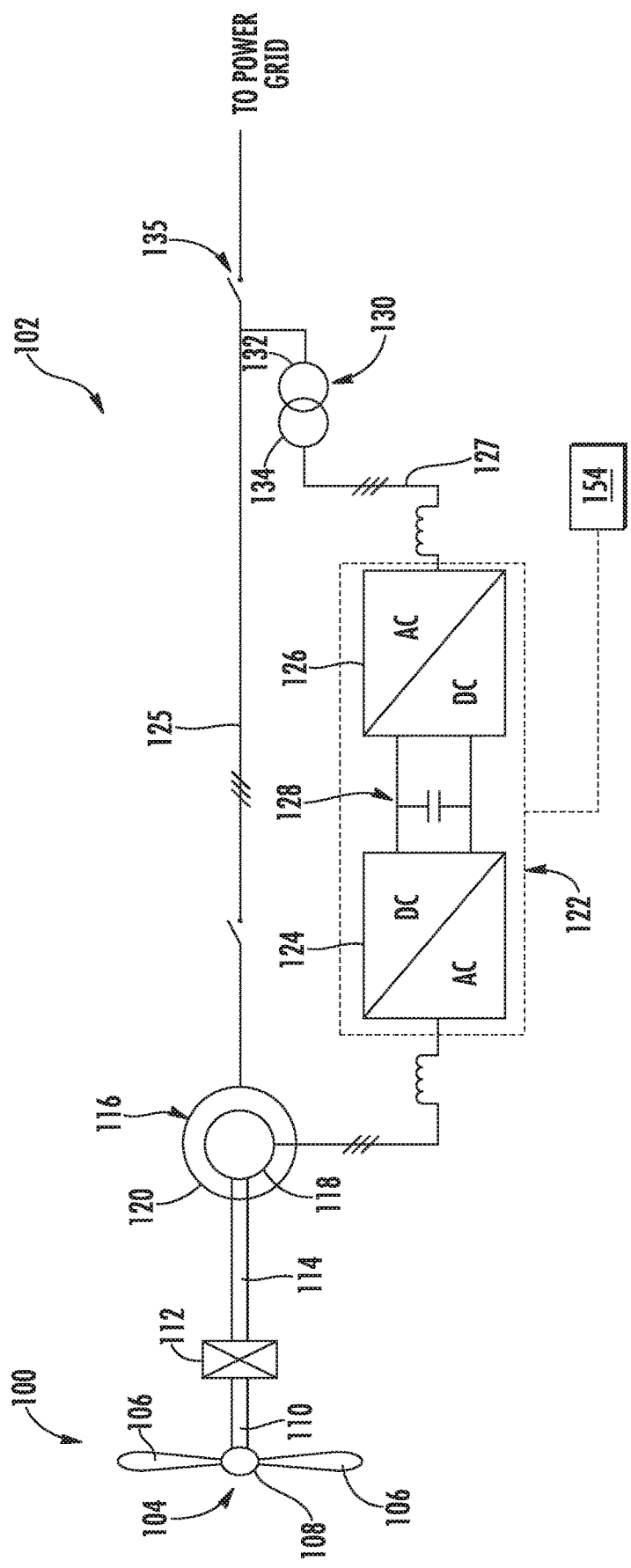
FIG. 4 illustrates a schematic diagram of one embodiment of an electrical power system for a wind turbine according to the present disclosure.

Referring now to FIG. 4, a schematic diagram of one embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or FIG. 3 that includes a plurality of electrical power subsystems 102. Those of ordinary skill in the art, however, will recognize that the electrical power subsystem 102 of FIG. 4 (or FIG. 2) may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the line side converter 126. Notably, the partial power transformer may in some embodiments include a third auxiliary winding for auxiliary loads, as discussed herein.

In addition, the electrical power subsystem 102 may include a controller 136 configured to control any of the components of the wind turbine 100 and/or implement the method steps as described herein. For example, as shown particularly in FIG. 6, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
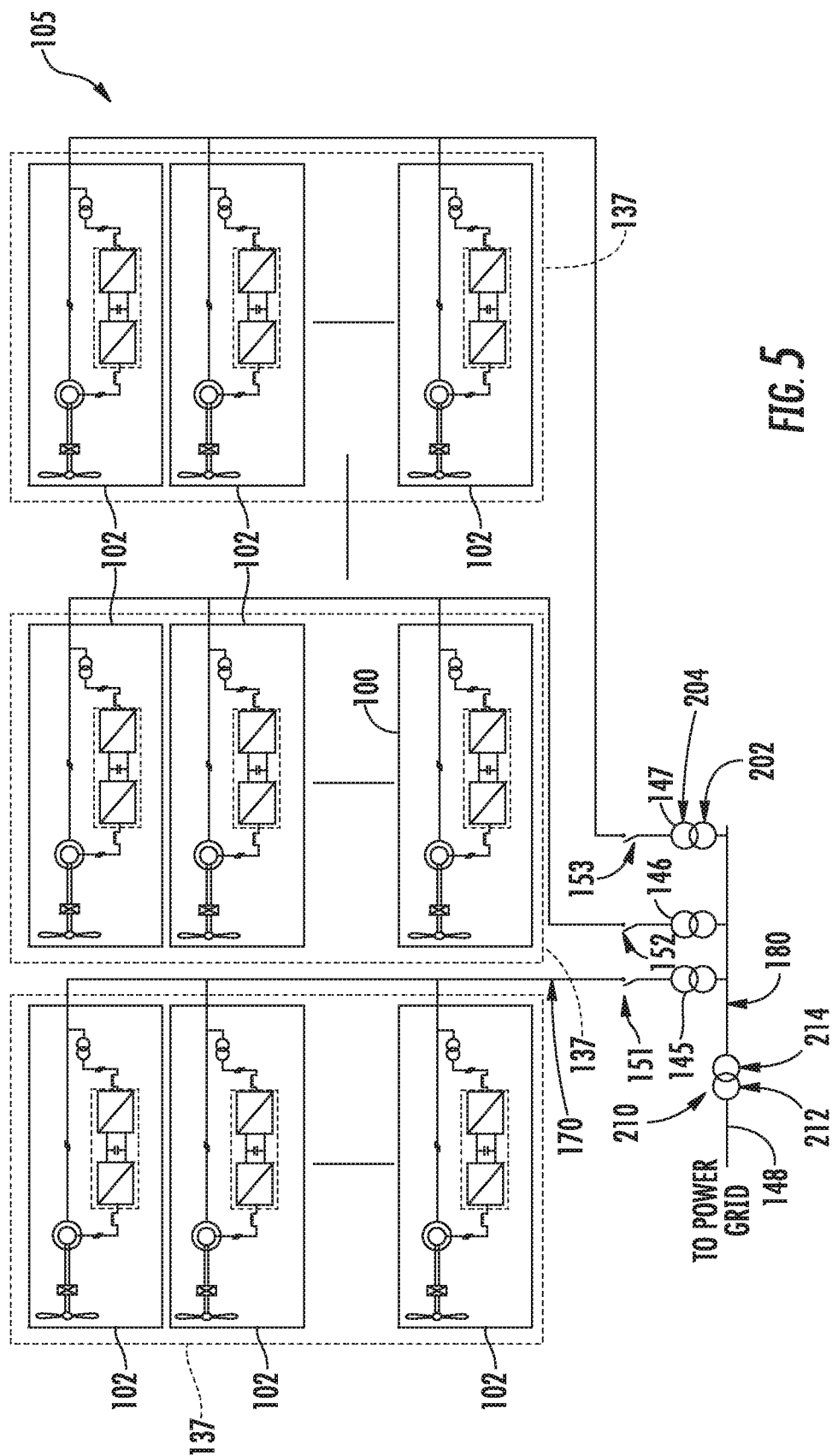
FIG. 5 illustrates a schematic diagram of one embodiment of a wind farm according to the present disclosure, particularly illustrating a plurality of wind turbine clusters each connected to the grid via a cluster transformer.
Figure 6:
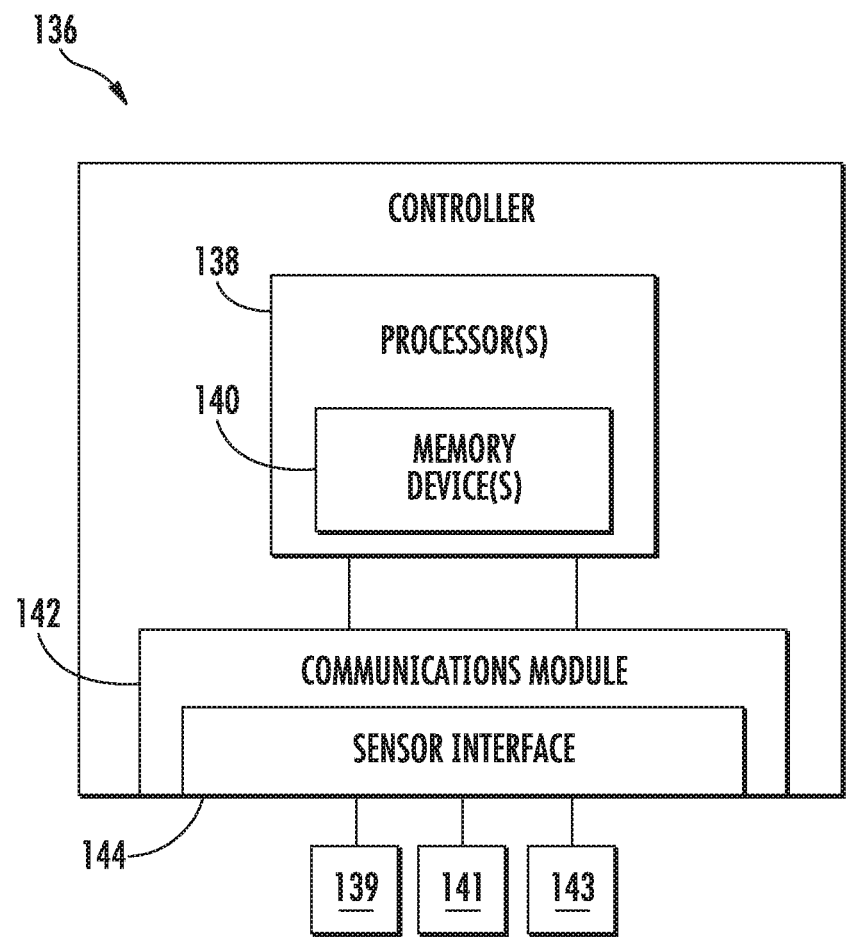
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate cluster transformer 145, 146, 147 via switches 151, 152, 153, respectively, for stepping up the voltage amplitude of the electrical power from each cluster 137 such that the transformed electrical power may be further transmitted to the power grid. In addition, as shown, the transformers 145, 146, 147 are connected to a main line 148 (via a substation transformer as discussed herein) that combines the power from each cluster 137 before sending the power to the grid. In other words, as shown, the stator power circuit of all the wind turbines 100 share a common ground reference provided by the neutral of the secondary winding 124 of the cluster transformer 145, 146, 147 or by a separate neutral grounding transformer. Each subsystem 102 may be connected to the cluster 137 via a subsystem breaker 135, as shown.

Referring still to FIG. 5, and as discussed, the cluster 137 includes a cluster transformer 145, 146, 147 connecting each cluster 137 of electrical power subsystems 102 to the power grid. Thus, the cluster 137 includes a cluster switch 151, 152, 153 configured with the cluster transformer 145, 146, 147. A cluster power path 170 may electrically connect the cluster 137 to the cluster transformer 145, 146, 147, such as via cluster switches 151, 152, 153. The cluster power path 170 may, for example, extend from each subsystem 102, such as the converter power path 127 and stator power path 125 thereof, to the cluster transformer 145, 146, 147, such as to the winding of the cluster transformer to which the subsystem 102 is connected.

The cluster transformer 145, 146, 147 is, in exemplary embodiments, a two-winding transformer 145, 146, 147. Further, in exemplary embodiments, the cluster transformer 145, 146, 147 steps the voltage up from a low voltage level at the substation level to a medium voltage at the cluster level.

For example, the voltage on the stator power path 125 of each subsystem 102 may be a medium voltage, such as between 6 and 14 kV, or between 12 and 14 kV. The voltage on the converter power path 127 after the power converter 122 may be a low voltage, such as between 600 and 900 V. This voltage may be stepped up to the medium voltage level of 6 and 14 kV, or between 12 and 14 kV, by the partial power transformer 130. Partial power transformer 130 may thus include a primary winding 132 having a voltage between 6 and 14 kV, or between 12 and 14 kV, and a secondary winding 134 having a voltage between 600 and 900 V.

Each cluster transformer 145, 146, 147 may include a primary winding 202 and a secondary winding 204. The secondary winding 204 may be connected to the cluster power path 170, and the primary winding 202 may be connected to a collection system power path 180 leading to the power grid. The primary winding 202 may have a voltage between 30 and 35 Kilovolts, and the secondary winding 204 may have a voltage between 11 and 15 Kilovolts.

The collection system power path 180 may extend between each cluster transformer 145, 146, 147 and a substation transformer 210. In exemplary embodiments, substation transformer 210 is a two-winding transformer. The substation transformer 210 may electrically connect the cluster transformers 145, 146, 147 to the power grid. The substation transformer 210 may include a primary winding 212 and a secondary winding 214. The secondary winding 214 may be connected to the collection system power path 180, and the primary winding 212 may be connected to a main line 148 leading to the power grid. The primary winding 212 may have a voltage between 110 and 250 Kilovolts, and the secondary winding 214 may have a voltage between 30 and 35 Kilovolts.

Figure 7:
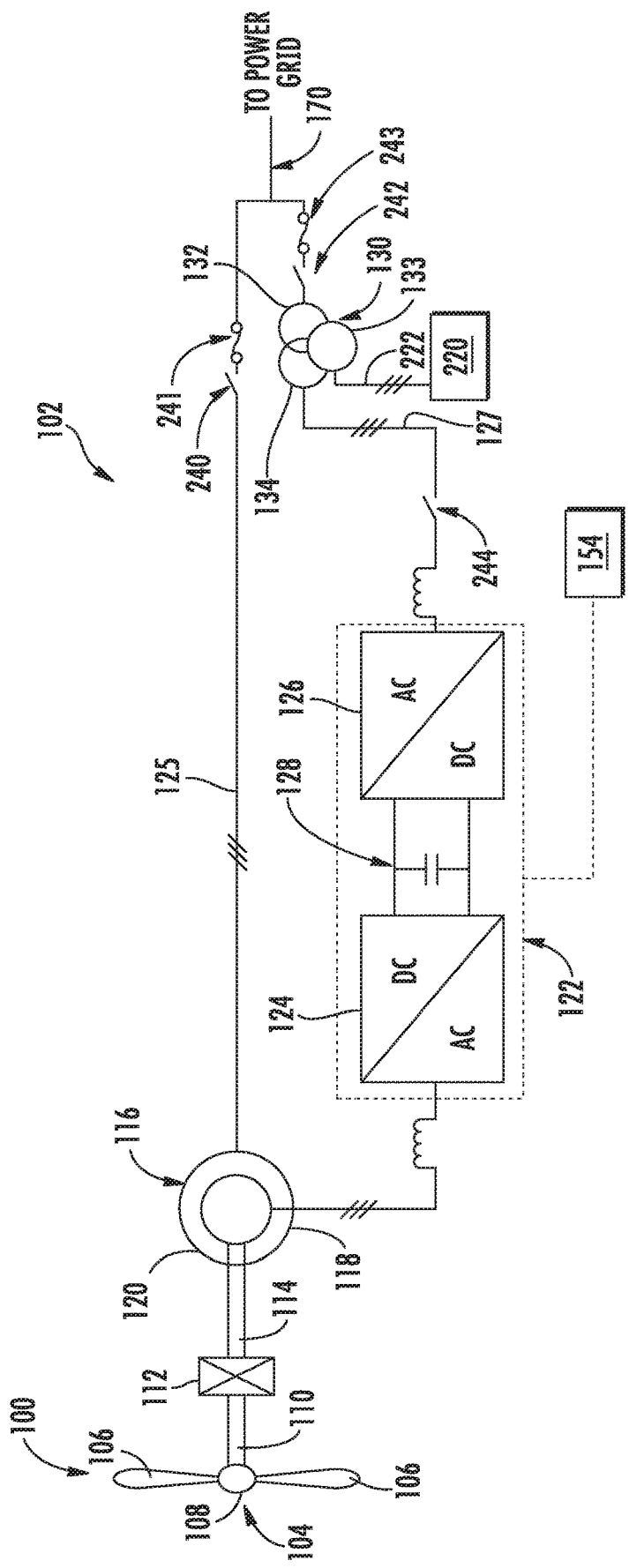
FIG. 7 illustrates a schematic diagram of one embodiment of an electrical power system for a wind turbine according to the present disclosure.
Figure 8:
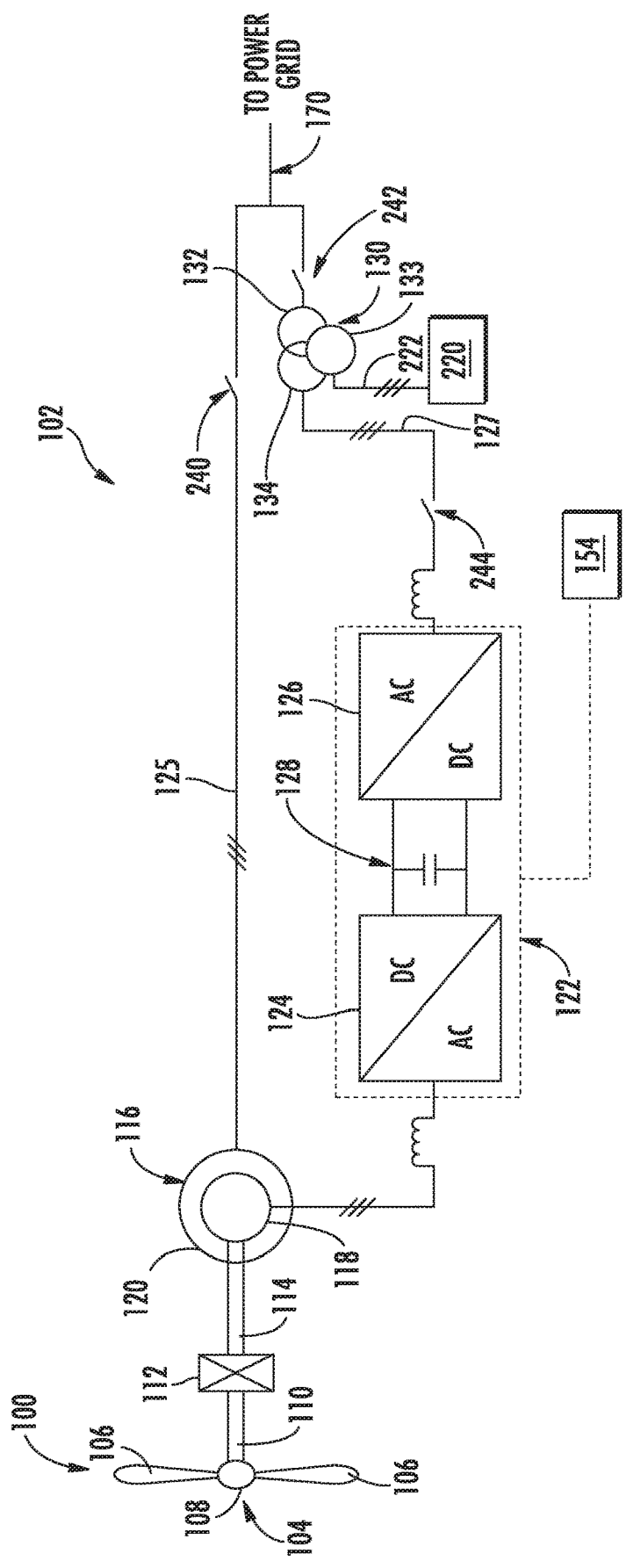
FIG. 8 illustrates a schematic diagram of another embodiment of an electrical power system for a wind turbine according to the present disclosure.
Figure 9:
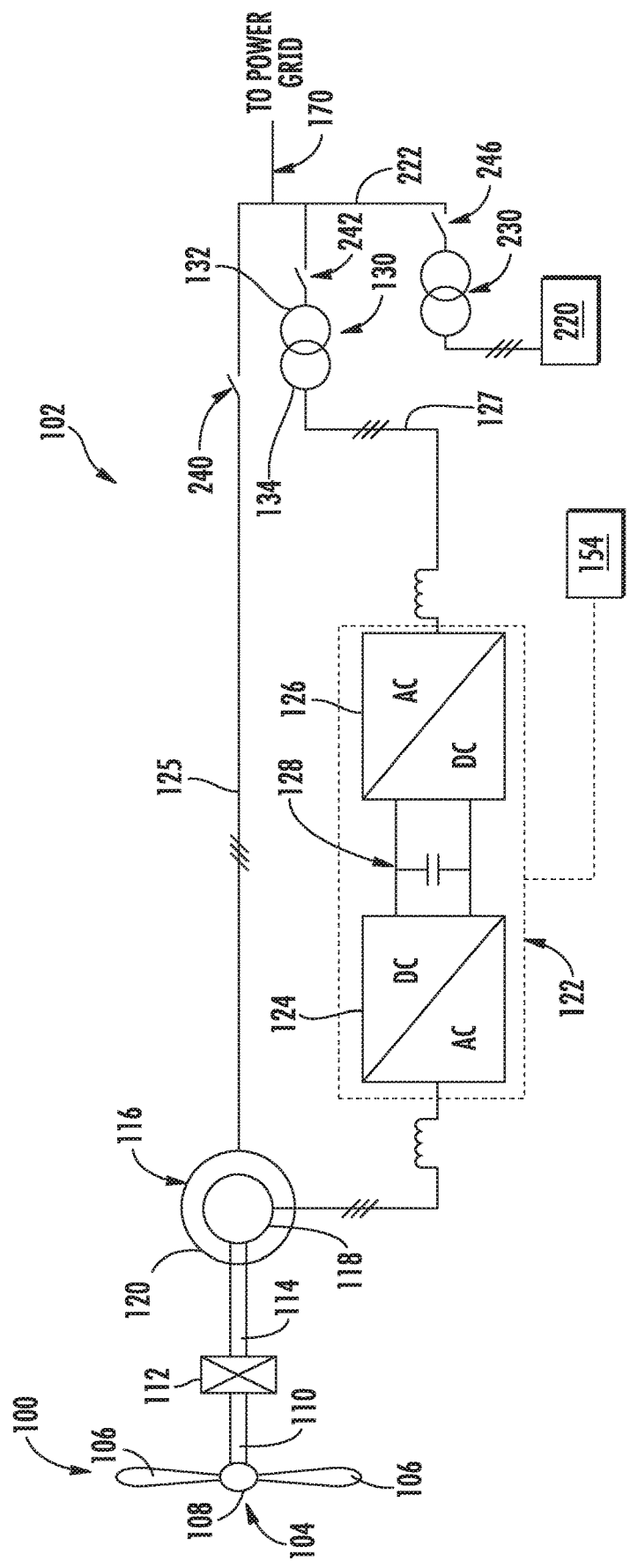
FIG. 9 illustrates a schematic diagram of another embodiment of an electrical power system according to the present disclosure.

Referring now to FIGS. 7-9, in exemplary embodiments, each subsystem 102 of the system 105 of FIG. 5 may include various features for reducing cost and increasing efficiency. Such features may advantageously simplify the protective scheme and necessary components thereof for the subsystems 102 and system 105 generally. For example, as shown, each subsystem 102 may include a low voltage distribution panel 220 which is electrically coupled to the converter power path 127, such as the line side thereof as shown. The low voltage distribution panel 220 may provide power to auxiliary loads, such as lighting and other relatively small loads within the wind turbine of the subsystem 102.

In some embodiments, as illustrated in FIGS. 7 and 8, the partial power transformer 130 is a three-winding transformer which includes an auxiliary winding 133 in addition to primary winding 132 and secondary winding 134. Auxiliary winding 133 may be a low voltage (300-900 V) winding. Power may be provided through auxiliary winding 133 to the low voltage distribution panel 220. An auxiliary power path 222 thus extends between and electrically couples the panel 220 and auxiliary winding 133.

In other embodiments, as illustrated in FIG. 9, the partial power transformer 130 is a two-winding transformer which includes only the primary winding 132 and secondary winding 134. In these embodiments, power may be provided to the low voltage distribution panel 220 via an electrical coupling of the low voltage distribution panel 220 to the primary winding 132 side of the converter power path 127, such as to the converter power path 127 between the transformer 130 and the cluster power path 170, via the auxiliary power path 222. In these embodiments an auxiliary power transformer 230 may be provided on the auxiliary power path 222, and may provide such electrical coupling. The auxiliary power transformer 230 may, in exemplary embodiments, be a two-winding transformer with low voltage (600-900 V) primary winding and medium voltage (6-14 or 12-14 mV) secondary winding.

Subsystem 102 may further include various switches, which may be relatively low cost switches due to the high efficiency nature of the subsystem 102.

For example, a first switch 240 may be provided on the stator power path 125. In some embodiments, as shown in FIG. 7, the first switch 240 is a contactor, such as a vacuum contactor. In these embodiments, a fuse 241 may additionally be provided on the stator power path 125, such that the switch 240 is configured as a contactor and fuse. In alternative embodiments, as shown in FIGS. 8 and 9, the first switch 240 is a circuit breaker. Alternatively, other suitable switches may be utilized.

Additionally or alternatively, a second switch 142 may be provided on the converter power path 127, such as on the line side between the partial power transformer 130 and the cluster power path 170 (i.e. on the primary winding 132 side of the converter power path 127). In some embodiments, as shown in FIG. 7, the second switch 242 is a contactor, such as a vacuum contactor. In these embodiments, a fuse 243 may additionally be provided on the converter power path 127, such that the switch 242 is configured as a contactor and fuse. In alternative embodiments, as shown in FIGS. 8 and 9, the second switch 242 is a circuit breaker. Alternatively, other suitable switches may be utilized.

In some embodiments, as illustrated in FIGS. 7 and 8, a third switch 144 may be provided on the converter power path 127, such as on the line side between the power converter 122 and the partial power transformer 130 (i.e. on the secondary winding 134 side of the converter power path 127). For example, such third switch 144 may be provided in embodiments wherein the partial power transformer 130 is a three-winding transformer. Alternatively, in other embodiments as illustrated in FIG. 9, no third switch 144 is necessary in this location. For example, the third switch 144 may be eliminated in embodiments wherein the partial power transformer 130 is a two-winding transformer. Further, in some embodiments as illustrated in FIG. 9 when a two-winding partial power transformer 130 is utilized, a fourth switch 146 may be provided. For example, as shown, the fourth switch 146 may be provided on the auxiliary power path 222 between the auxiliary transformer 230 and the converter side power path 127.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connectable to a power grid, comprising:
   a cluster of electrical power subsystems, the cluster including a plurality of electrical power subsystems,
   each of the electrical power subsystems comprising a power converter electrically coupled to a generator having a generator rotor and a generator stator,
   each of the electrical power subsystems defining a stator power path and a converter power path for providing power to the power grid, the converter power path comprising a partial power transformer,
   each of the electrical power subsystems further comprising a low voltage distribution panel electrically coupled to the converter power path,
   a first switch on the stator power path, and
   a second switch on the converter power path;
   a cluster transformer including a primary winding and a secondary winding, the secondary winding electrically coupled to the cluster of electrical power subsystems;
   a cluster power path extending between each electrical power subsystem and the secondary winding of the cluster transformer to electrically couple the secondary winding of the cluster transformer to the cluster of electrical power subsystems;
   a substation transformer for connecting the primary winding of the cluster transformer to the power grid; and
   a collection system power path extending between the primary winding of the cluster transformer and the substation transformer.

2. The electrical power system of claim 1, wherein the primary winding has a voltage between 30 and 35 Kilovolts and the secondary winding has a voltage between 11 and 15 Kilovolts.

3. The electrical power system of claim 1, wherein the substation transformer comprises a two-winding transformer.

4. The electrical power system of claim 1, wherein the substation transformer comprises a primary winding having a voltage between 110 and 250 Kilovolts and a secondary winding having a voltage between 30 and 35 Kilovolts.

5. The electrical power system of claim 1, wherein the low voltage distribution panel is electrically coupled to an auxiliary winding of the partial power transformer.

6. The electrical power system of claim 5, further comprising a third switch on the converter power path between the power converter and the partial power transformer.

7. The electrical power system of claim 5, wherein at least one of the first switch or the second switch is a contactor.

8. The electrical power system of claim 7, wherein the at least one of the first switch or the second switch further comprises a fuse.

9. The electrical power system of claim 5, wherein at least one of the first switch or the second switch is a circuit breaker.

10. The electrical power system of claim 1, wherein the low voltage distribution panel is electrically coupled to the converter power path between the partial power transformer and the cluster power path by an auxiliary power transformer and a fourth switch.

* * * * *